United States Patent
Bonn et al.

(10) Patent No.: US 10,361,953 B1
(45) Date of Patent: Jul. 23, 2019

(54) DATA COMMUNICATION SYSTEM TO DIRECT A USER EQUIPMENT TO RE-ORIGINATE A MEDIA SESSION INVITE HAVING A WIRELESS PRIORITY SERVICE (WPS) PREFIX OVER A LONG TERM EVOLUTION (LTE) NETWORK

(71) Applicant: Sprint Communications Company L.P., Overland Park, KS (US)

(72) Inventors: Mark J. Bonn, Granite Bay, CA (US); Abdolreza Asghari, Santa Clara, CA (US); James D. Kirby, San Mateo, CA (US); Dominick Mangiardi, Fremont, CA (US); John Tayag Susbilla, Milpitas, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 277 days.

(21) Appl. No.: 15/044,819

(22) Filed: Feb. 16, 2016

(51) Int. Cl.
*H04L 12/741* (2013.01)
*H04L 29/06* (2006.01)
*H04W 4/14* (2009.01)

(52) U.S. Cl.
CPC .......... *H04L 45/74* (2013.01); *H04L 65/1006* (2013.01); *H04L 65/1016* (2013.01); *H04L 65/1069* (2013.01); *H04L 69/22* (2013.01); *H04W 4/14* (2013.01)

(58) Field of Classification Search
CPC combination set(s) only.
See application file for complete search history.

(56) References Cited

U.S. PATENT DOCUMENTS

| | | | |
|---|---|---|---|
| 5,388,147 A | 2/1995 | Grimes | |
| 6,985,740 B2 | 1/2006 | Shyy et al. | |
| 8,045,973 B2 | 10/2011 | Chambers | |
| 8,346,225 B2 | 1/2013 | Raleigh | |
| 2010/0128722 A1* | 5/2010 | Madour | H04L 12/66 370/352 |
| 2010/0135205 A1 | 6/2010 | Li et al. | |
| 2011/0201338 A1 | 8/2011 | Zou | |
| 2012/0034910 A1 | 2/2012 | Fang et al. | |
| 2013/0060954 A1* | 3/2013 | Dahlqvist | H04L 65/1016 709/228 |
| 2014/0376511 A1* | 12/2014 | Kalapatapu | H04L 65/1016 370/331 |

(Continued)

*Primary Examiner* — Xavier Szewai Wong (57) ABSTRACT

An Internet Protocol Multimedia Subsystem (IMS) receives a media session invite having a Wireless Priority Service (WPS) prefix over a non-Long Term Evolution (LTE) network for a User Equipment (UE). The IMS identifies the WPS prefix and adds a Resource Priority Header (RPH) indicating that the media session invite is for a WPS call. The IMS transfers an authentication request to a WPS Application Server to authenticate the UE for the WPS call based on a UE identifier and receives an authentication response indicating that the UE is authenticated. The IMS determines that the media session invite was transferred over the non-LTE network and transfers an instruction to the UE indicating that the UE should re-originate the media session invite over the LTE network. The UE receives the instruction and transfers the media session invite having the WPS prefix to the IMS over the LTE network.

18 Claims, 8 Drawing Sheets

(56) References Cited

U.S. PATENT DOCUMENTS

2016/0156783 A1\* 6/2016 Mufti .................... H04M 3/465
                                                    455/445
2016/0261996 A1\* 9/2016 Malik ..................... H04W 4/90
2017/0093929 A1\* 3/2017 Hockey ............... H04L 65/1016

\* cited by examiner

DATA COMMUNICATION SYSTEM TO DIRECT A USER EQUIPMENT TO RE-ORIGINATE A MEDIA SESSION INVITE HAVING A WIRELESS PRIORITY SERVICE (WPS) PREFIX OVER A LONG TERM EVOLUTION (LTE) NETWORK

TECHNICAL BACKGROUND

Wireless communication systems provide User Equipment (UE), such as smartphones, tablet computers, and other media devices, wireless access to communication services and allow users to move about and communicate over the air with access communication networks. Data communication networks, such as Long Term Evolution (LTE), exchange data packets with UEs to provide services, such as internet access, media streaming, voice calls, and text messaging.

Using LTE, a UE detects and attaches to an LTE base station, such as an evolved NodeB (eNodeB). eNodeBs support the exchange of signaling and data to LTE network elements, such as Serving Gateways (S-GWs), Mobility Management Entities (MMEs), Packet Data Network Gateways (P-GWs), Policy Charging Rules Functions (PCRFs), and other network elements.

Internet Protocol Multimedia Subsystem (IMS) is a popular control system to facilitate the exchange of Internet Protocol (IP) packets between UEs for media sessions and other data transfer services. The UE registers an IP address with the IMS systems over the IP access networks and use the registered IP address to exchange messaging for the IP communication sessions. A UE may register with an IMS system directly using various access systems, including LTE, Code Division Multiple Access (CDMA), Global System for Mobile Communications (GSM), Ethernet, and other access systems.

Wireless Priority Services (WPS) is a federally administered service which provides emergency preparedness and national security personnel access to cellular networks for high-priority calls during periods of network congestion, such as during an emergency situation. WPS approved personnel register UEs with a participating network provider and may utilize WPS to initiate a high priority call by entering a WPS prefix to a destination address, such as *272 followed by a ten-digit mobile number.

While a media session invite for an approved UE may be transferred to the IMS system over an untrusted network, such as a Wireless Fidelity (WiFi) network to a carrier secure gateway, the LTE network may be preferred to allow full priority services to be initiated over a trusted network. An IMS may use an alternative network to receive a media session invite having a WPS prefix from a UE, but unfortunately, current interactions between a WPS approved UE and IMS systems are not effective for redirecting the media session invite having a WPS prefix from an untrusted network to an LTE network.

TECHNICAL OVERVIEW

A data communication system has a Long Term Evolution (LTE) network, a non-LTE network, and an Internet Protocol Multimedia Subsystem (IMS). The IMS receives a media session invite having a Wireless Priority Service (WPS) prefix over the non-LTE network for a User Equipment (UE). The IMS identifies the WPS prefix in the media session invite and adds a Resource Priority Header (RPH) to the media session invite indicating that the media session invite is for a WPS call. The IMS transfers an authentication request for the media session invite for delivery to a WPS Application Server to authenticate the UE for the WPS call based on a UE identifier and receives an authentication response transferred by the WPS Application Server indicating that the UE is authenticated for the WPS call. The IMS determines that the media session invite was transferred over the non-LTE network and transfers an instruction to the UE indicating that the UE should re-originate the media session invite having the WPS prefix over the LTE network. The UE receives the instruction indicating that the UE should re-originate the media session invite having the WPS prefix over the LTE network and transfers the media session invite having the WPS prefix to the IMS over the LTE network.

DETAILED DESCRIPTION

Figure 1:
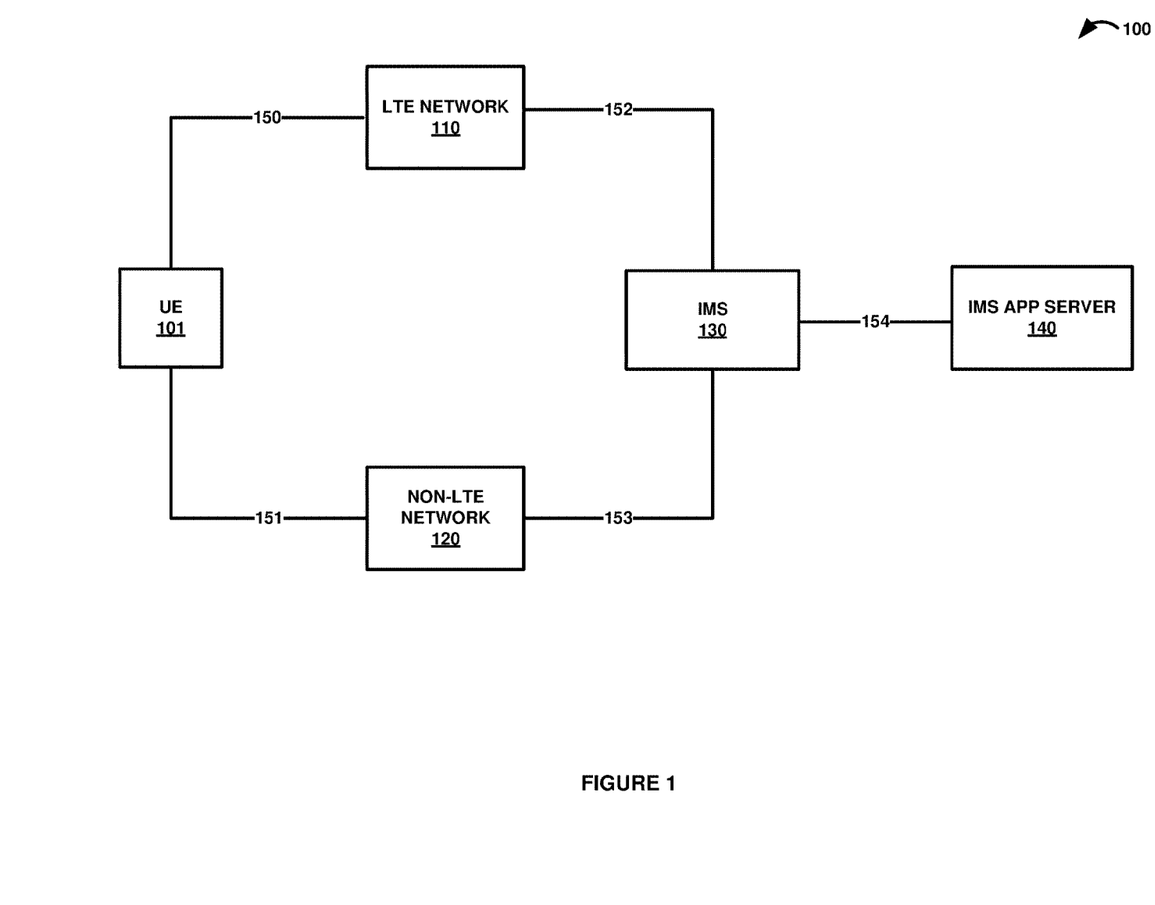
FIGS. 1-3 illustrate a data communication system to direct a User Equipment (UE) to re-originate a media session invite having a Wireless Priority Service (WPS) prefix over a Long Term Evolution (LTE) network.
Figure 2:
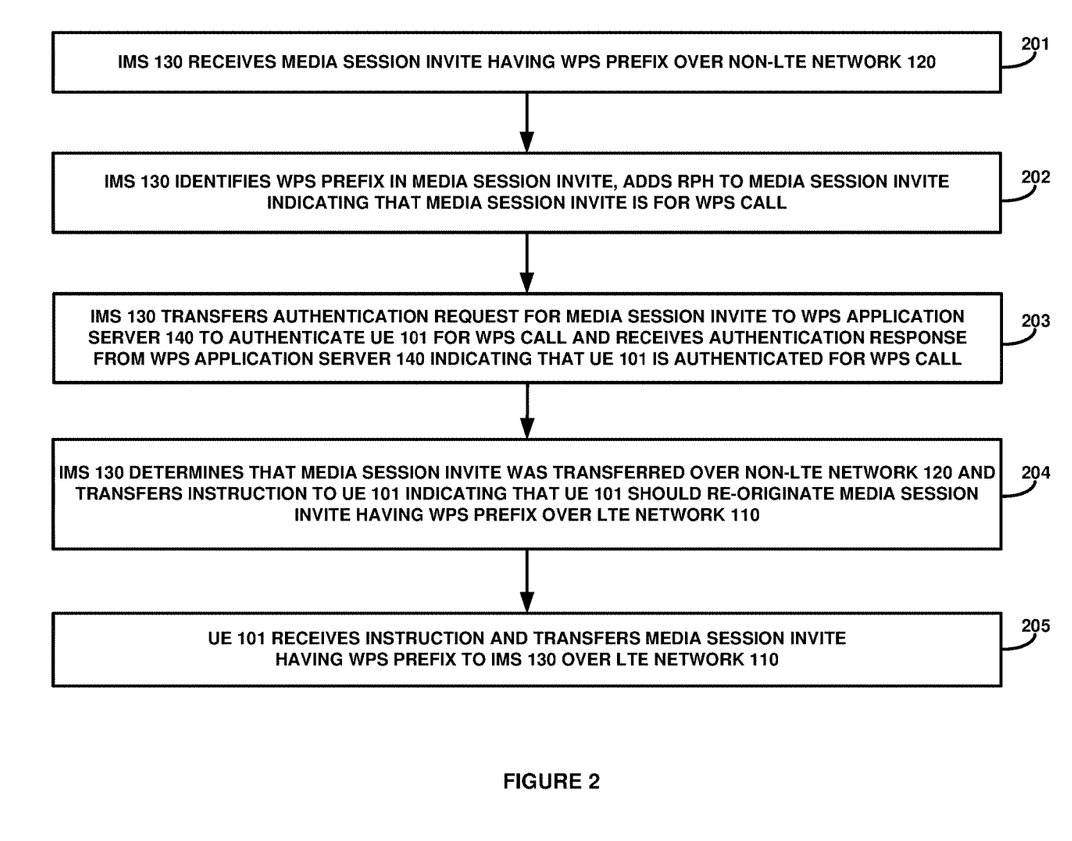
Figure 3:
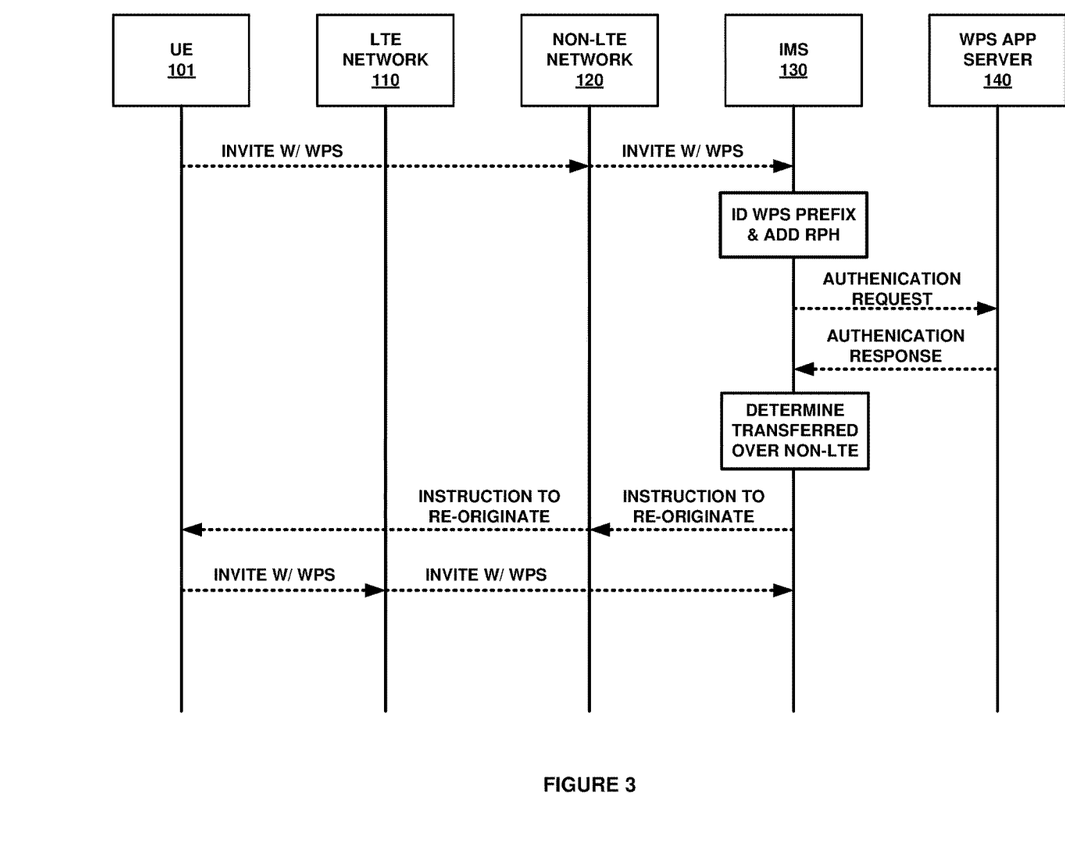

FIGS. 1-3 illustrate data communication system 100 to direct a User Equipment (UE) to re-originate a media session invite having a Wireless Priority Service (WPS) prefix over a Long Term Evolution (LTE) network. Data communication system 100 includes UE 101, LTE network 110, non-LTE network 120, Internet Protocol (IP) Multimedia Subsystem (IMS) 130, and WPS Application Server 140. UE 101 and LTE network 110 communicate over wireless link 150. LTE network 110 and IMS 130 communicate over communication link 152. UE 101 and non-LTE network 120 communicate over communication link 151. Non-LTE network 120 and IMS 130 communicate over communication link 153. IMS 130 communicates with WPS Application Server 140 over communication link 154.

In operation, IMS 130 receives a media session invite having a WPS prefix over non-LTE network 120 for UE 101. WPS approved personnel may register UEs with a participating network provider which and the registration information may also be stored in a government administered server, such as WPS Application Server 140. UE 101 may then utilize WPS to initiate a high priority call by entering a WPS prefix to a destination address, such as *272 followed by a ten-digit mobile number.

IMS 130 may receive the media session invite over non-LTE network 120 due to prior registration with non-LTE network 120, LTE network 110 offloading to allow additional capacity, user preferences, or some other reason that UE 101 would transfer the media session invite over non-LTE network 120. IMS 130 may receive the invite from a Voice over Wireless Fidelity (VoWifi) Secure Gateway, from a Packet Data Network Gateway (P-GW) which received the media session invite from non-LTE network 120, or some other network element capable of transferring the media session invite to IMS 130. IMS 130 may receive the invite in a Proxy Call Session Control Function (P-CSCF), a Session Boarder Controller (SBC), or in some other IMS 130 network element. In some cases, the SBC may be located inside of the P-CSCF. However, in other instances, the P-CSCF and the SBC may also be separate.

IMS 130 then identifies the WPS prefix in the media session invite and adds a Resource Priority Header (RPH) to indicate that the media session invite is for a WPS call. An RPH is typically used to establish preferential treatment for the media session when competing for wireless network resources. The RPH may be added into the header of an invite, re-invite, redirect, or some other media session message.

In a next operation, IMS 130 transfers an authentication request for the media session invite to WPS Application Server 140 to authenticate UE 101 for the WPS call based on a UE identifier, and responsively receives an authentication response transferred by WPS Application Server 140 indicating that UE 101 is authenticated for the WPS call. WPS Application Server 140 may receive approved WPS UE information after registering with WPS administration services. In some examples, UE 101 may be authenticated by IMS 130 querying a Home Subscriber System (HSS) or a Telephony Application Server (TAS) to determine a Radio Access Technology (RAT) type which UE 101 registered with IMS 130 over. This registration information is typically indicated in a P-Access-Network-Information (PANI) header in a Session Initiation Protocol (SIP) register message or register message. UE identifiers may include an International Mobile Subscriber Identifier (IMSI), Internet Protocol (IP) address, Mobile Device Number (MDN), Mobile Identification Number (MIN), Uniform Resource Identifier (URI), or some other identifier—including combinations thereof.

IMS 130 also determines that the media session invite was transferred over non-LTE network 120. IMS 130 may determine that the media session invite was transferred over non-LTE network 120 by processing the IP address to determine if the media session invite was transferred from a non-LTE network element, or a P-GW serving a non-LTE network element, such as a VoWiFi Secure Gateway. IMS 130 may also determine that the media session invite was transferred over non-LTE network 120 by processing an IP port number to determine if the media session invite was transferred from a non-LTE network element. In some cases, IMS 130 may query a Domain Name Server (DNS) to determine if the media session invite was transferred over non-LTE network 120.

In response to receiving the authentication response transferred by WPS Application Server 140 and determining that the media session invite was transferred over non-LTE network 120, IMS 130 transfers an instruction to UE 101 indicating that UE 101 should re-originate the media session invite having the WPS prefix over LTE network 110. IMS 130 may transfer the instruction to UE 101 in a SIP message requesting that UE 101 send the media session invite in a re-invite message over LTE network 110. IMS 130 may also transfer the instruction to UE 101 in a Mobile Terminated (MT) Short Message Service (SMS) message indicating that UE 101 should re-originate the media session invite in over LTE network 110.

Next, UE 101 receives the instruction transferred by IMS 130 indicating that UE 101 should re-originate the media session invite having the WPS prefix over LTE network 110 and UE 101 transfers the media session invite having the WPS prefix to IMS 130 over LTE network 110. UE 101 may have already registered with LTE network 110 prior to receiving the instruction to re-originate the media session invite. However, in some cases UE 101 may register with LTE network 110 after receiving the instruction to re-originate the media session invite over LTE network 110. It should be noted that the user of UE 101 may not be alerted that the instruction to re-originate the media session invite over LTE network 110 and that UE 101 may transfer the media session invite having the WPS prefix to IMS 130 over LTE network 110 without receiving directions from the user.

In some examples, a P-CSCF transfers a SIP re-invite request to UE 101 indicating that UE 101 should re-originate the media session invite having the WPS prefix over LTE network 110. In other examples, a Session Boarder Controller (SBC) transfers a SIP re-invite request to UE 101 indicating that UE 101 should re-originate the media session invite having the WPS prefix over LTE network 110. For example, the P-CSCF in IMS 130 may transfer the instruction in a SIP re-invite message indicating that UE 101 should move from a WiFi network to LTE network 110 and send the media session invite having the WPS prefix in a WPS re-invite message over LTE network 110.

In some examples, a P-CSCF transfers a Mobile Terminated (MT) Short Message Service (SMS) message to UE 101 indicating that UE 101 should re-originate the media session invite having the WPS prefix over LTE network 110. In other examples, an SBC transfers an MT SMS message to UE 101 indicating that UE 101 should re-originate the media session invite having the WPS prefix over LTE network 110. For example, the SBC in IMS 130 may initiate signaling to deliver the MT SMS message on a custom teleservices port to UE 101 to trigger a handoff from non-LTE network 120 to LTE network 110. UE 101 would then receive the MT SMS trigger on the custom teleservices port and move to LTE network 110 to re-originate the media session invite having the WPS prefix.

In some examples, a P-CSCF identifies the WPS prefix in the media session invite and adds the RPH to the media session invite indicating that the media session invite is for the WPS call. In other examples, an SBC identifies the WPS prefix in the media session invite and adds the RPH to the media session invite indicating that the media session invite is for the WPS call. For example, the SBC may identify the *272 prefix and add an RPH with a namespace ets.0 to identify the call as a WPS call and hold the media session invite from being transferred to an S-CSCF until UE 101 has been authenticated and use of LTE network 110 is verified.

In some examples, IMS 130 processes a source IP address to determine that the media session invite having the WPS prefix was transferred over non-LTE network 120. For example, the P-CSCF in IMS 130 may query a DNS to determine that the IP address was transferred from a P-GW that received the media session invite from a VoWiFi Secure Gateway in non-LTE network 120. In other examples, IMS 130 processes a source port number to determine that the media session invite having the WPS prefix was transferred over non-LTE network 120. For example, an SBC in IMS 130 may determine that the media session invite having the WPS prefix was received from a source port associated with the VoWiFi Secure Gateway.

FIG. 2 is a flow diagram illustrating an operation of data communication system 100 to direct a UE to re-originate a media session invite having a WPS prefix over an LTE network. IMS 130 receives (201) a media session invite having a WPS prefix over non-LTE network 120 for UE 101. IMS 130 identifies (202) the WPS prefix in the media session invite. IMS 130 adds (202) a Resource Priority Header (RPH) to the media session invite indicating that the media session invite is for a WPS call. IMS 130 transfers (203) an authentication request for the media session invite to WPS Application Server 140 to authenticate UE 101 for the WPS call based on a UE identifier. IMS 130 then receives (203) an authentication response transferred by WPS Application Server 140 indicating that UE 101 is authenticated for the WPS call.

IMS 130 determines (204) that the media session invite was transferred over non-LTE network 120. IMS 130 transfers (204) an instruction to UE 101 indicating that UE 101 should re-originate the media session invite having the WPS prefix over LTE network 110. UE 101 receives (205) the instruction indicating that UE 101 should re-originate the media session invite having the WPS prefix over LTE network 110. UE 101 transfers (205) the media session invite having the WPS prefix to IMS 130 over LTE network 110.

FIG. 3 is a sequence diagram illustrating an operation of LTE communication system 100 to direct a UE to re-originate a media session invite having a WPS prefix over an LTE network. IMS 130 receives a media session invite having a WPS prefix over non-LTE network 110 for UE 101. For example, a government employee approved to use WPS services may initiate a WPS call to contact National Security Department support staff when the wireless network is congested at the scene of a natural disaster.

IMS 130 identifies the WPS prefix in the media session invite and adds a Resource Priority Header (RPH) to the media session invite indicating that the media session invite is for a WPS call. For example, the SBC in IMS 130 may identify the *272 prefix and in response, add an RPH to indicate the WPS call has priority over other standard calls being requested.

Next, IMS 130 transfers an authentication request for the media session invite to WPS Application Server 140 to authenticate UE 101 for the WPS call based on a UE identifier. In response, IMS 130 receives an authentication response transferred by WPS Application Server 140 indicating that UE 101 is authenticated for the WPS call. For example, WPS Application Server 140 may receive the authentication request indicating an IMSI associated with UE 101 from a Serving Call Session Control Function (S-CSCF) in IMS 130. WPS Application Server 140 would then query an internal database maintained by the National Security Department to determine if the IMSI matches a WPS approved UE. Once WPS Application Server 140 determines that the IMSI associated with UE 101 is authenticated, WPS Application Server 140 transfers an authentication response to IMS 130.

IMS 130 then determines that the media session invite was transferred over non-LTE network 120. For example, IMS 130 may process an IP port number indicating that the WPS media session invite was transferred from a VoWiFi Secure Gateway. IMS 130 then transfers an instruction to UE 101 indicating that UE 101 should re-originate the media session invite having the WPS prefix over the LTE network 110. For example, the P-CSCF in IMS 130 may transfer an MT SMS message to UE 101 indicating that the WPS media session invite was received from the VoWiFi Secure Gateway and that UE 101 should attach to LTE network 110 and retransfer the WPS media session invite over LTE network 110.

UE 101 receives the instruction indicating that UE 101 should re-originate the media session invite having the WPS prefix over LTE network 110. Finally, UE 101 transfers the media session invite having the WPS prefix over LTE network 110 to IMS 130. For example, UE 101 may have originally attached to non-LTE network 120 upon entering the scene of the natural disaster but later attach to LTE network 110 after receiving the instruction to re-originate the media session invite over LTE network 110. UE 101 may then transfer a SIP re-invite for the media session invite having the WPS prefix over LTE network 110.

Figure 4:
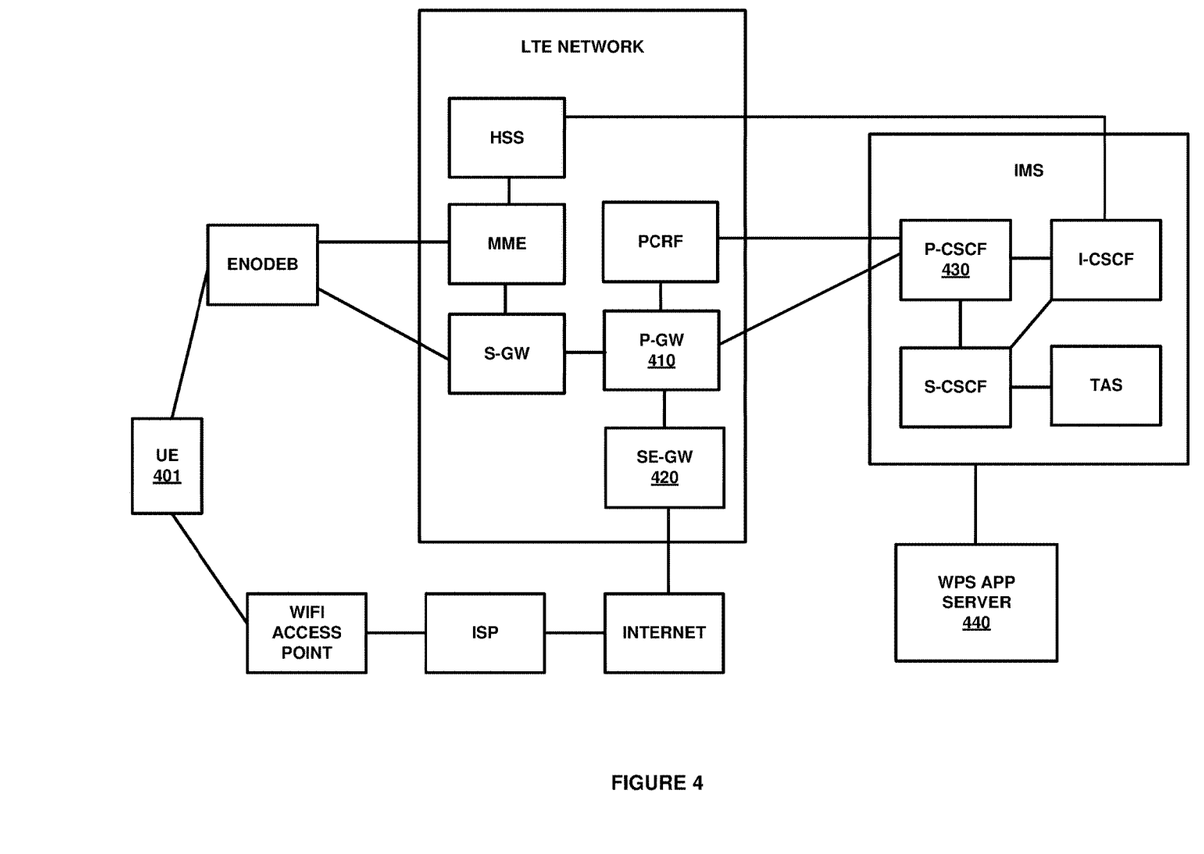
FIGS. 4-6 illustrate a data communication system to direct a UE to re-originate a media session invite having a WPS prefix over an LTE network.
Figure 5:
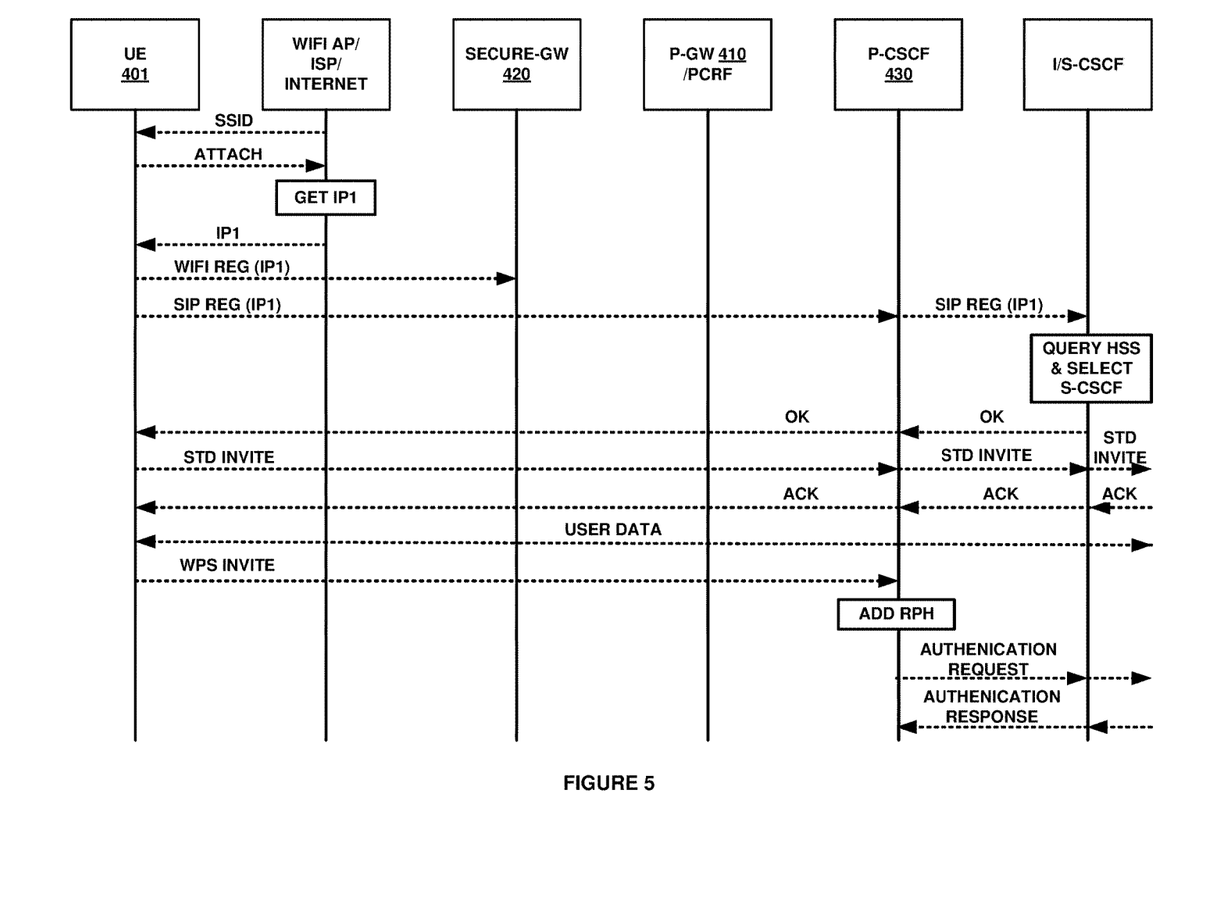
Figure 6:
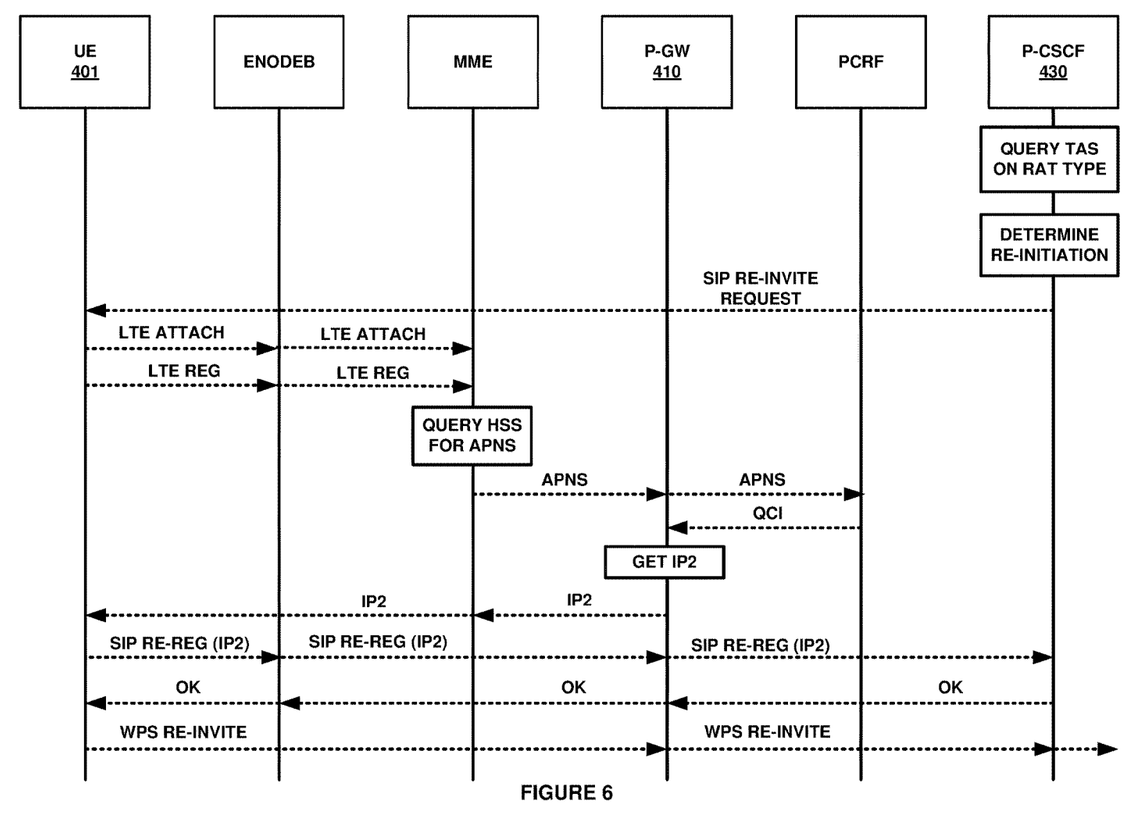

FIGS. 4-6 illustrate data communication system 400 to direct a UE to re-originate a media session invite having a WPS prefix over an LTE network. Data communication system 400 is an example of data communication system 100, although data communication system 100 may use alternative configurations and operations. Referring to FIG. 4, data communication system 400 includes UE 401, an evolved NodeB (eNodeB), an LTE network, an IMS, and WPS Application Server 440. Data communication system 400 also includes a WiFi Access Point, an Internet Service Provider (ISP), and Internet.

The LTE network includes a Serving Gateway (S-GW), Mobility Management Entity (MME), HSS, P-GW 410, a Policy Changing Rules Function (PCRF), and VoWiFi Secure Gateway (Se-GW) 420. The IMS includes P-CSCF 430, an Interrogating Call Session Control Function (I-CSCF), a Serving Call Session Control Function (S-CSCF), and a Telephony Application Server (TAS). Although not shown in FIG. 4, P-CSCF 430 may include an SBC. However, both P-CSCF 430 and an SBC may be capable of performing the operations described below separately. It should be noted that Se-GW 420 transfers media and signaling through the PCRF/P-GW 410 to P-CSCF 430. However, in other examples, Se-GW 420 may transfer media and signaling directly to P-CSCF 430 or through some other network element capable of transferring media and signaling to the IMS in data communication system 400.

FIG. 5 and FIG. 6 illustrate an operation of data communication system 400 to direct a UE to re-originate a media session invite having a WPS prefix over an LTE network. Referring to FIG. 5, UE 401 detects a Service Set Identifier (SSID) broadcasted from the WiFi Access Point. UE 401 then attaches to the WiFi network over the WiFi Access Point, ISP, and the Internet and receives a first IP address. UE 401 then registers the first IP address with Se-GW 420. UE 401 also registers the first IP address with P-CSCF 430 in the IMS. P-CSCF 430 transfers the SIP register message to the I-CSCF which queries the HSS to select the S-CSCF. The SIP register message may contain a PANI header in the register message which includes the Media Access Control (MAC) address for the WiFi Access Point and access-type. This information may be registered in the HSS to reflect the network type of connection. The I-CSCF then forwards the SIP register message to the selected S-CSCF and the S-CSCF transfers a SIP OK message to UE 401 over P-CSCF 430, the PCRF/P-GW 410, Se-GW 420, Internet, ISP, and WiFi Access Point.

In a next operation, UE 401 initiates a standard media session invite over the WiFi network, such as a VoWiFi call. The standard media session invite is transferred to P-CSCF 430 in the IMS over the WiFi Access Point, ISP, Internet, Se-GW 420, and the PCRF/P-GW 410. P-CSCF 430 then transfers the standard media session invite to the S-CSCF to transfer the standard media session invite in the IMS to the destination UE. In this example, the standard media session invite is transferred to the destination UE and the destination UE accepts the invite. An acknowledgement (ACK) response message is then transferred to UE 401 over the S-CSCF, P-CSCF 430, the PCRF/P-GW 410, Se-GW 420, and the associated WiFi network elements. UE 401 and the destination UE then exchange user data.

In a next operation, UE 401 has terminated the standard media session with the destination UE and initiates a WPS media session invite, such as a VoWiFi call over the WiFi network to P-CSCF 430. The VoWiFi call includes a WPS prefix, such as *272. In response to P-CSCF 430 receiving the VoWiFi call including the WPS prefix from UE 401, P-CSCF 430 identifies the WPS prefix and adds an RPH to the WPS media session invite. P-CSCF 430 then transfers an authentication request for the WPS media session invite to WPS Application Server 440 over the S-CSCF and receives a WPS authentication response from WPS Application Server 440 indicating that UE 401 is authorized to use WPS services for the WPS media session invite.

FIG. 6 illustrates a continuation to the operation of data communication system 400 to direct a UE to re-originate a media session invite having a WPS prefix over an LTE network, as illustrated in FIG. 5. In response to receiving the authentication response from WPS Application Server 440 over the S-CSCF, P-CSCF 430 determines that the WPS media session invite was transferred over the WiFi network by querying the HSS to determine the RAT type in which UE 401 has registered with the IMS over. P-CSCF 430 then transfers a SIP re-direct message to UE 401 over the PCRF/P-GW 410, Se-GW 420, Internet, ISP, and WiFi Access Point. The SIP re-direct message indicates that UE 401 should re-originate the WPS media session invite having the WPS prefix over the LTE network.

In response to receiving the SIP re-direct message to UE 401 over the WiFi network, UE 401 attaches and registers with the LTE network over the eNodeB and the MME. The MME in the LTE network then queries the HSS for an Access Point Name (APN) data set. In response to receiving the APN data set, the MME transfers the APN data set for UE 401 to P-GW 410 and P-GW 410 transfers the APN data set to the PCRF to establish QCIs for SIP signaling, such as a QCI 5. P-GW 410 then determines the second IP address and transfers the second IP address to the MME which responsively transfers the second IP address to UE 401 over the eNodeB.

In response to receiving the second IP address associated with the LTE network, UE 401 re-registers with the IMS by transferring a SIP re-register message including a PANI header indicating that UE 401 is registered with the IMS over the LTE network. UE 401 receives an OK message from P-CSCF 430 in the IMS and in response, transfers a media session re-invite having the WPS prefix, such as a Voice over LTE (VoLTE) call, to P-CSCF 430 over P-GW 410 and associated LTE network elements.

Figure 7:
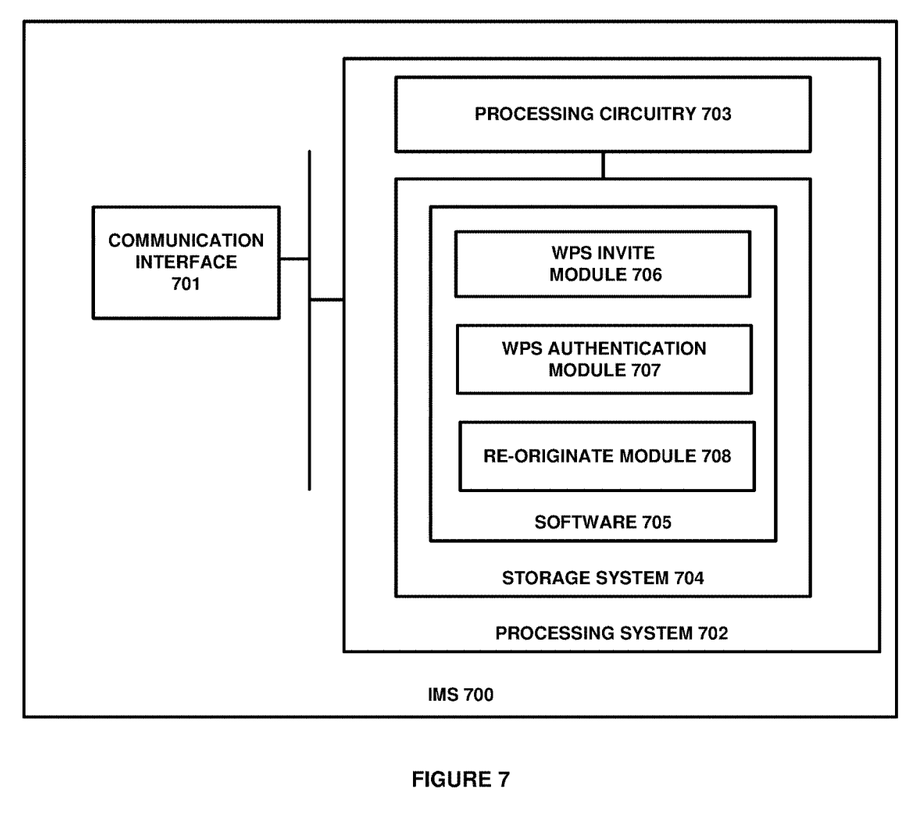
FIG. 7 illustrates an Internet Protocol (IP) Multimedia Subsystem (IMS) to direct a UE to re-originate a media session invite having a WPS prefix over an LTE network.

FIG. 7 illustrates IMS 700 to direct a UE to re-originate a media session invite having a WPS prefix over an LTE network. IMS system 700 is an example of IMS 130 and P-CSCF 430, although IMS 130 and P-CSCF 430 may use alternative configurations and operations. IMS 700 includes communication interface 701 and data processing system 702. Data processing system 702 is linked to communication interface 701.

Communication interface 701 receives media session invites from UEs and transfers instructions to re-originate media session invites to UEs over LTE networks and non-LTE networks. Communication interface 701 also transfers authentication requests and receives authentication responses to a WPS Application Server for media session invites to authenticate UEs for WPS calls based on UE identifiers.

Data processing system 702 includes processing circuitry 703 and storage system 704 that stores software 705. Processing circuitry 703 comprises a microprocessor and other circuitry that retrieves and executes software 705 from storage system 704. Storage system 704 comprises a non-transitory storage medium, such as a disk drive, flash drive, data storage circuitry, or some other memory apparatus. Software 705 comprises computer programs, firmware, or some other form of machine-readable processing instructions. Software 705 may further include an operating system, utilities, drivers, network interfaces, applications, or some other type of software. When executed by processing circuitry 703, software 705 directs processing system 702 to operate IMS 700 as described herein.

In particular, when executed by processing circuitry 703, WPS invite module 706 directs processing circuitry 704 to drive communication interface 701 to receive a media session invite having a WPS prefix over a non-LTE network for a UE. When executed by processing circuitry 703, WPS invite module 706 also directs processing circuitry 704 to identify the WPS prefix in the media session invite and add a RPH to the media session invite indicating that the media session invite is for a WPS call. WPS invite module 706 also directs processing circuitry 704 to determine that the media session invite was transferred over the non-LTE network.

When executed by processing circuitry 703, WPS authentication module 707 directs processing circuitry 703 to drive communication interface 701 to transfer an authentication request for the media session invite to a WPS Application Server to authenticate the UE for the WPS call based on a UE identifier. When executed by processing circuitry 703, WPS authentication module 707 also directs processing circuitry 703 to drive communication interface 701 to receive an authentication response transferred by the WPS Application Server indicating that the UE is authenticated for the WPS call.

When executed by processing circuitry 703, re-origination module 708 directs processing circuitry 703 to drive communication interface 701 to transfer an instruction to the UE indicating that the UE should re-originate the media session invite having the WPS prefix over the LTE network. When executed by processing circuitry 703, re-origination module 708 directs processing circuitry 703 to drive communication interface 701 to receive the re-originated media session invite having the WPS prefix over the LTE network.

Figure 8:
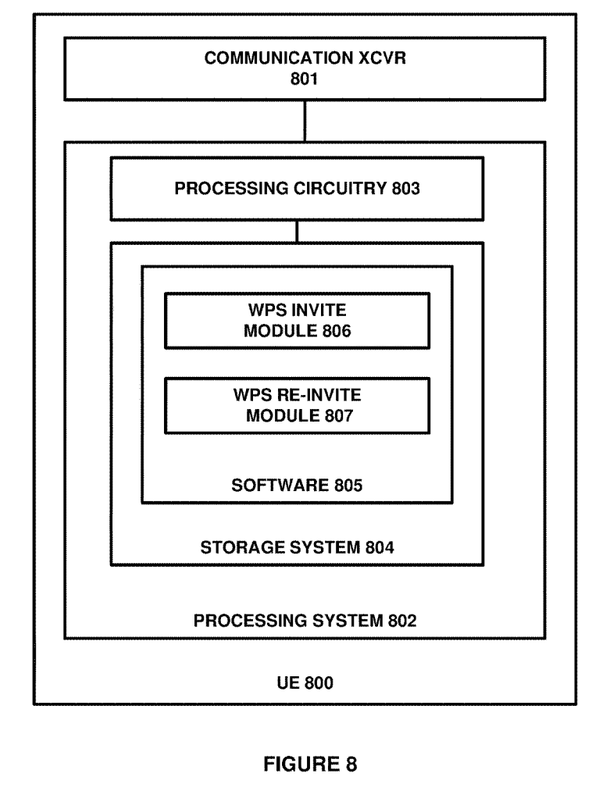
FIG. 8 illustrates a UE to re-originate a media session invite having a WPS prefix over an LTE network.

FIG. 8 illustrates UE 800 to re-originate a media session invite having a WPS prefix over an LTE network. UE 800 is an example of UE 101 and UE 401, although UE 101 and UE 401 may use alternative configurations and operations. UE 800 includes communication transceiver 801 and data processing system 802. Data processing system 802 is linked to communication transceiver 801.

Communication transceiver 801 comprises communication components, such as antennas, ports, amplifiers, filters, modulators, signal processors, and the like. Communication transceiver 801 transfers and receives media session invites which may include a WPS prefix over non-LTE networks and LTE networks. Communication transceiver 801 also receives instructions from an IMS over a non-LTE network indicating that the UE should re-originate a media session invite having the WPS prefix over the LTE network.

Data processing system 802 includes processing circuitry 803 and storage system 804 that stores software 805. Processing circuitry 803 comprises a microprocessor and other circuitry that retrieves and executes software 805 from storage system 804. Storage system 804 comprises a non-transitory storage medium, such as a disk drive, flash drive, data storage circuitry, or some other memory apparatus. Software 805 comprises computer programs, firmware, or some other form of machine-readable processing instructions. Software 805 may further include an operating system, utilities, drivers, network interfaces, applications, or some other type of software. When executed by processing circuitry 803, software 805 directs processing system 802 to operate UE 800 as described herein.

In particular, when executed by processing circuitry 803, WPS invite module 806 directs processing circuitry 804 to drive communication transceiver 801 to transfer a media session invite having a WPS prefix to an IMS over a non-LTE network. When executed by processing circuitry 803, WPS re-invite module 807 directs processing circuitry 803 to drive communication transceiver 801 to receive an instruction from the IMS indicating that the UE should re-originate the media session invite having the WPS prefix over the LTE network transfer the re-originated media session invite having the WPS prefix to the IMS over the LTE network.

Referring back to FIG. 1, UE 101 includes a user interface, memory device, software, processing circuitry, Radio Frequency (RF) communication circuitry, or some other communication components. UE 101 may be a telephone, computer, e-book, mobile Internet appliance, wireless network interface card, media player, game console, or some other wireless communication apparatus—including combinations thereof. UE 101 is a dual mode device capable of communicating over multiple wireless protocols, including LTE wireless networks and non-LTE wireless networks.

LTE network 110 comprises computers, bus interfaces, and communication ports that comprise processing circuitry and memory devices to store and execute various software modules. LTE network 120 may also include other components such as a router, server, data storage system, and power supply. LTE network 120 may reside in a single device or may be distributed across multiple devices. LTE network 120 may comprise packet gateways of various types like S-GWs, P-GWs, High Speed Packet Access Gateways (HSPA-GWs), High Rate Packet Data Gateways (HRPD-GWs), Evolved Packet Data Gateways (ePDGs), Multimedia Broadcast Multicast Service Gateways (M-GWs), a Broadcast Multicast Service Center (BM-SC), and/or some other type of data packet interface into an LTE system. LTE network 120 may also include PCRFs, On-line Charging Systems (OCSs), and various LTE control systems, such as MMEs, HSS, and DNS.

Non-LTE network 120 comprises communication and control systems for providing UE 101 access to IMS 130 and other communication services. Alternative communication network 140 may comprise non-LTE networks such as Code Division Multiple Access (CDMA), Evolution-Data Optimized (EVDO), Global System for Mobile Communication (GSM), Worldwide Interoperability for Microwave Access (WiMAX), WiFi, or some other cellular or wireless communication format, including combinations, improvements, or variations thereof.

Wireless links 150-151 may use air, space, or some other wireless material that transports media. Wireless links 150-151 may use protocols, such as LTE, CDMA, EVDO, IP, or some other wireless communication formats—including combinations thereof. Communication links 152-155 may use metal, glass, optics, air, space, or some other material as the transport media. Communication links 152-155 may use Time Division Multiplexing (TDM), IP, Ethernet, Synchronous Optical Networking (SONET), communication signaling, wireless communications, or some other communication format—including improvements thereof. Communication links 152-155 may be a direct link, or can include intermediate networks, systems, or devices, and can include a logical network link transported over multiple physical links.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a data communication system having a Long Term Evolution (LTE) network, a non-LTE network, and an Internet Protocol Multimedia Subsystem (IMS), the method comprising:
    the IMS receiving a media session invite having a Wireless Priority Service (WPS) called number prefix over the non-LTE network for a User Equipment (UE);
    the IMS identifying the WPS called number prefix in the media session invite and adding a Resource Priority Header (RPH) to the media session invite indicating that the media session invite is for a WPS call;
    the IMS transferring an authentication request for the media session invite for delivery to a WPS Application Server to authenticate the UE for the WPS call based on a UE identifier and responsively receiving an authentication response transferred by the WPS Application Server indicating that the UE is authenticated for the WPS call;
    the IMS processing a source Internet Protocol (IP) address to determine that the media session invite having the WPS called number prefix was transferred over the non-LTE network and in response, transferring an instruction to the UE indicating that the UE should re-originate the media session invite having the WPS called number prefix over the LTE network;
    the UE receiving the instruction indicating that the UE should re-originate the media session invite having the WPS called number prefix over the LTE network and responsively transferring the media session invite having the WPS called number prefix for delivery to the IMS over the LTE network.

2. The method of claim 1 wherein the IMS transferring the instruction to the UE indicating that the UE should re-originate the media session invite having the WPS called number prefix over the LTE network comprises a Proxy Call Session Control Function (P-CSCF) transferring a Session Initiation Protocol (SIP) re-invite request to the UE indicating that the UE should re-originate the media session invite having the WPS called number prefix over the LTE network.

3. The method of claim 1 wherein the IMS transferring the instruction to the UE indicating that the UE should re-originate the media session invite having the WPS called number prefix over the LTE network comprises a Session Boarder Controller (SBC) transferring a Session Initiation Protocol (SIP) re-invite request to the UE indicating that the UE should re-originate the media session invite having the WPS called number prefix over the LTE network.

4. The method of claim 1 wherein the IMS transferring the instruction to the UE indicating that the UE should re-originate the media session invite having the WPS called number prefix over the LTE network comprises a Proxy Call Session Control Function (P-CSCF) transferring a Mobile Terminated (MT) Short Message Service (SMS) message to the UE indicating that the UE should re-originate the media session invite having the WPS called number prefix over the LTE network.

5. The method of claim 1 wherein the IMS transferring the instruction to the UE indicating that the UE should re-originate the media session invite having the WPS called number prefix over the LTE network comprises a Session Boarder Controller (SBC) transferring a Mobile Terminated (MT) Short Message Service (SMS) message to the UE indicating that the UE should re-originate the media session invite having the WPS called number prefix over the LTE network.

6. The method of claim 1 wherein the IMS identifying the WPS called number prefix in the media session invite and adding the RPH to the media session invite indicating that the media session invite is for the WPS call comprises a Proxy Call Session Control Function (P-CSCF) identifying the WPS called number prefix in the media session invite and adding the RPH to the media session invite indicating that the media session invite is for the WPS call.

7. The method of claim 1 wherein the IMS identifying the WPS called number prefix in the media session invite and adding the RPH to the media session invite indicating that the media session invite is for the WPS call comprises a Session Boarder Controller (SBC) identifying the WPS called number prefix in the media session invite and adding the RPH to the media session invite indicating that the media session invite is for the WPS call.

8. The method of claim 1 wherein the IMS processing the source IP address to determine that the media session invite having the WPS called number prefix was transferred over the non-LTE network further comprises the IMS processing a source port number to determine that the media session invite having the WPS called number prefix was transferred over the non-LTE network.

9. The method of claim 1 further comprising, in response to receiving the instruction indicating that the UE should re-originate the media session invite having the WPS called number prefix over the LTE network, the UE registering with the LTE network and responsively transferring the media session invite having the WPS called number prefix for delivery to the IMS over the LTE network.

10. A data communication system having a Long Term Evolution (LTE) network, a non-LTE network, and an Internet Protocol Multimedia Subsystem (IMS), the data communication system comprising:
the IMS configured to receive a media session invite having a Wireless Priority Service (WPS) called number prefix over the non-LTE network for a User Equipment (UE);
the IMS configured to identify the WPS called number prefix in the media session invite and add a Resource Priority Header (RPH) to the media session invite indicating that the media session invite is for a WPS call;
the IMS configured to transfer an authentication request for the media session invite for delivery to a WPS Application Server to authenticate the UE for the WPS call based on a UE identifier and receive an authentication response transferred by the WPS Application Server indicating that the UE is authenticated for the WPS call;
the IMS configured to processing a source Internet Protocol (IP) address to determine that the media session invite having the WPS called number prefix was transferred over the non-LTE network and in response, transfer an instruction to the UE indicating that the UE should re-originate the media session invite having the WPS called number prefix over the LTE network;
the UE configured to receive the instruction indicating that the UE should re-originate the media session invite having the WPS called number prefix over the LTE network and responsively transfer the media session invite having the WPS called number prefix for delivery to the IMS over the LTE network.

11. The data communication system of claim 10 wherein the IMS configured to transfer the instruction to the UE indicating that the UE should re-originate the media session invite having the WPS called number prefix over the LTE network comprises a Proxy Call Session Control Function (P-CSCF) configured to transfer a Session Initiation Protocol (SIP) re-invite request to the UE indicating that the UE should re-originate the media session invite having the WPS called number prefix over the LTE network.

12. The data communication system of claim 10 wherein the IMS configured to transfer the instruction to the UE indicating that the UE should re-originate the media session invite having the WPS called number prefix over the LTE network comprises a Session Boarder Controller (SBC) configured to transfer a Session Initiation Protocol (SIP) re-invite request to the UE indicating that the UE should re-originate the media session invite having the WPS called number prefix over the LTE network.

13. The data communication system of claim 10 wherein the IMS configured to transfer the instruction to the UE indicating that the UE should re-originate the media session invite having the WPS called number prefix over the LTE network comprises a Proxy Call Session Control Function (P-CSCF) configured transfer a Mobile Terminated (MT) Short Message Service (SMS) message to the UE indicating that the UE should re-originate the media session invite having the WPS called number prefix over the LTE network.

14. The data communication system of claim 10 wherein the IMS configured to transfer the instruction to the UE indicating that the UE should re-originate the media session invite having the WPS called number prefix over the LTE network comprises a Session Boarder Controller (SBC) configured to transfer a Mobile Terminated (MT) Short Message Service (SMS) message to the UE indicating that the UE should re-originate the media session invite having the WPS called number prefix over the LTE network.

15. The data communication system of claim 10 wherein the IMS configured to identify the WPS called number prefix in the media session invite and add the RPH to the media session invite indicating that the media session invite is for the WPS call comprises a Proxy Call Session Control Function (P-CSCF) configured to identify the WPS called number prefix in the media session invite and add the RPH to the media session invite indicating that the media session invite is for the WPS call.

16. The data communication system of claim 10 wherein the IMS configured to identify the WPS called number prefix in the media session invite and add the RPH to the media session invite indicating that the media session invite is for the WPS call comprises a Session Boarder Controller (SBC) configured to identify the WPS called number prefix in the media session invite and add the RPH to the media session invite indicating that the media session invite is for the WPS call.

17. The data communication system of claim 10 wherein the IMS configured to processing the source IP address to determine that the media session invite having the WPS called number prefix was transferred over the non-LTE network further comprises the IMS configured to process a source port number to determine that the media session invite having the WPS called number prefix was transferred over the non-LTE network.

18. The data communication system of claim 10 further comprising, in response to receiving the instruction indicating that the UE should re-originate the media session invite having the WPS called number prefix over the LTE network, the UE configured to register with the LTE network and responsively transfer the media session invite having the WPS called number prefix for delivery to the IMS over the LTE network.

\* \* \* \* \*